(12) United States Patent
Golovashchenko et al.

(10) Patent No.: US 10,322,890 B2
(45) Date of Patent: Jun. 18, 2019

(54) SHEET METAL BLANK DESTACKER

(71) Applicant: OAKLAND UNIVERSITY, Rochester, MI (US)

(72) Inventors: Sergey F. Golovashchenko, Beverly Hills, MI (US); Yuriy V. Batygin, Kharkov (UA)

(73) Assignee: OAKLAND UNIVERSITY, Rochester, MI (US)

( * ) Notice: Subject to any disclaimer, the term of this patent is extended or adjusted under 35 U.S.C. 154(b) by 52 days.

(21) Appl. No.: 15/786,038

(22) Filed: Oct. 17, 2017

(65) Prior Publication Data

US 2018/0105373 A1 Apr. 19, 2018

Related U.S. Application Data

(60) Provisional application No. 62/409,072, filed on Oct. 17, 2016.

(51) Int. Cl.
B65G 54/02 (2006.01)
B65G 59/04 (2006.01)
(Continued)

(52) U.S. Cl.
CPC .......... B65G 59/04 (2013.01); B25J 15/0085 (2013.01); B25J 15/0616 (2013.01); B65G 47/91 (2013.01);
(Continued)

(58) Field of Classification Search
CPC ........ B65G 59/04; B65G 54/02; B65G 47/92; B65G 47/91; B65G 2201/022; B65H 3/16;
(Continued)

(56) References Cited

U.S. PATENT DOCUMENTS 2,650,092 A * 8/1953 Wall ................ B21D 43/24
271/18.1
3,196,649 A 7/1965 Furth
(Continued)

FOREIGN PATENT DOCUMENTS

CN 103183236 7/2013
EP 0640057 12/1998
(Continued)

OTHER PUBLICATIONS

Website http://mfgnewsweb.com/archives/4/38511/Automation-Robotics-Mfg-Systems-jul13/Destacker-Tooling-Design-Feeds-Aluminum-and-Steel-Blanks.aspx "Destacker Tooling Design Feeds Aluminum and Steel Blanks" Dated Jul. 1, 2013, Retrieved from the internet on Jan. 29, 2018, 2 pgs.
(Continued)

Primary Examiner — Gregory W Adams
(74) Attorney, Agent, or Firm — Brooks Kushman P.C.

(57) ABSTRACT

An apparatus for de-stacking sheet metal blanks uses electro-magnetic pulses to separate sheet metal blanks from a stack of blanks. A fixture supports an electromagnetic attraction device that includes one or more multi-turn electrical coils and one or more insulated metal screens. The coil is electrically connected to a bank of capacitors. The metal screen is disposed in an electrical insulation material and is retained by the fixture between the coil and the top blank of the stack of blanks. Suction cups perform the primary lifting function and are connected to a vacuum source. The suction cups may be supported by the same fixture or another associated fixture that cooperates with the coil and insulated screen.

20 Claims, 4 Drawing Sheets

(51) Int. Cl.
  *B65H 3/16* (2006.01)
  *B25J 15/06* (2006.01)
  *B25J 15/00* (2006.01)
  *B65G 47/91* (2006.01)
  *B65G 47/92* (2006.01)

(52) U.S. Cl.
  CPC ............ *B65G 47/92* (2013.01); *B65H 3/16* (2013.01); *B65G 2201/022* (2013.01); *Y10S 901/40* (2013.01)

(58) Field of Classification Search
  CPC .......... B65H 2701/173; B65H 2515/71; B65H 2701/1714; B25J 15/06; B25J 15/0616; B25J 15/0085; B25J 15/0071; B25J 15/0066; H01L 21/6838; H01L 21/6831; Y10S 901/40
  See application file for complete search history.

(56) References Cited

U.S. PATENT DOCUMENTS

| | | | |
|---|---|---|---|
| 3,998,081 A | | 12/1976 | Hansen et al. |
| 3,998,448 A | | 12/1976 | Gray et al. |
| 4,148,091 A | | 4/1979 | Hansen et al. |
| 4,754,637 A | | 7/1988 | Odell |
| 4,922,099 A | * | 5/1990 | Masuda .............. B03C 7/04 250/324 |
| 4,986,102 A | | 1/1991 | Hendrickson et al. |
| 5,046,345 A | | 9/1991 | Zieve |
| 5,102,288 A | * | 4/1992 | Kawasaka .............. A41H 15/00 269/54.5 |
| 5,176,494 A | | 1/1993 | Nigrelli et al. |
| 5,449,211 A | * | 9/1995 | Monford, Jr. ............ B25J 15/04 294/65.5 |
| 5,642,089 A | * | 6/1997 | Lysen ................. B23Q 3/1546 335/285 |
| 5,729,423 A | * | 3/1998 | Donde ................ H01L 21/6831 361/234 |
| 6,146,086 A | * | 11/2000 | Snell ...................... B65G 54/02 198/465.1 |
| 6,481,706 B1 | * | 11/2002 | Gaeddert ............... B65G 59/04 271/105 |
| 6,746,063 B1 | * | 6/2004 | Sanchez ................. B21D 43/24 271/18.1 |
| 8,720,882 B2 | | 5/2014 | Fuda et al. |
| 8,932,431 B2 | | 1/2015 | Coto et al. |
| 9,093,926 B2 | * | 7/2015 | Prahlad ............... B25J 15/0085 |
| 9,308,650 B2 | * | 4/2016 | Eisele ................. B25J 15/0071 |
| 9,403,280 B2 | * | 8/2016 | Regan ................. B25J 15/0675 |
| 2006/0086165 A1 | * | 4/2006 | Golovashchenko ... B21D 26/14 72/56 |
| 2008/0163661 A1 | | 7/2008 | Meichtry et al. |
| 2011/0110010 A1 | * | 5/2011 | Pelrine .................. B62D 57/00 361/234 |
| 2014/0104744 A1 | * | 4/2014 | Prahlad ................ B25J 15/0085 361/234 |
| 2015/0336272 A1 | * | 11/2015 | Drew .................... B25J 9/1687 156/64 |

FOREIGN PATENT DOCUMENTS

| | | |
|---|---|---|
| UA | 74909 | 8/2004 |
| WO | 2006119661 | 11/2006 |

OTHER PUBLICATIONS

Website http://www.fabricatingandmetalworking.com/2014/03/destacker-tooling-design-feeds-aluminum-and-steel-blanks, Dated Mar. 19, 2014, Retrieved from internet on Sep. 6, 2018.
Website http://www.thefabricator.com/article/stamping/controlling-double-sheet-in-stamping-operations "Controlling double sheet in stamping operations", Dated Jul. 13, 2004, Retrieved from internet on Sep. 6, 2018.
The Union Tool Corporation, "Union Sheet Feeder" Product Bulletin PB#12987, 2 pgs.
Vivek, A., Kim, K.H., Daehn, G.S., Simulation and instrumentation of electromagnetic compression of steel tubes. Journal of Materials Processing Technology 211, Aug. 23, 2010, pp. 840-850.
Psyk, V., Risch, D., Kinsey, B.L., Tekkaya, A.E., Kleiner, "Electromagnetic forming—A review", Journal of Materials Processing Technology 211, Dec. 15, 2010, pp. 787-829.
Shneepson, G.A., Fields and Transitional Processes in the Device of Superstrong Currents, 2nd Edition, 1992 Energy Atomizdat, Moscow.
Batygin, Y. V., Lavinsky, V.I., Khimenko, L.T., "Direction Change of the Force Action upon Conductor under Frequency Variation of the Acting Magnetic Field", 1st International Conference on High Speed Forming, Mar. 31/Apr. 1, 2004, Dortmund, Germany, pp. 157-160.
Batygin, Y.V., Golovashchenko, S.F., Gnatov, A.V., Pulsed electromagnetic attraction of sheet metals—Fundamentals and perspective applications, .Journal of Materials Processing Technology—Elsevier, # 213, Oct. 7, 2012, pp. 444-452.
Batygin, Y.V., Golovashchenko, S.F., Gnatov, A.V., "Pulsed electromagnetic attraction of nonmagnetic sheet metals", Journal of Materials Processing Technology.—?lsevier.—2014. #214, Sep. 14, 2013, pp. 390-401.
Deng, J., Li, C., Zhao, Z., Tu, F., Yu, H., "Numerical simulation of magnetic flux and force in electromagnetic forming with attractive force", Journal of Materials Processing Technology 184 (2007), Nov. 18, 2006, pp. 190-194.

* cited by examiner

SHEET METAL BLANK DESTACKER

REFERENCE TO RELATED APPLICATIONS

This application claims the benefit of U.S. provisional application Ser. No. 62/409,072 filed Oct. 17, 2016, the disclosure of which is hereby incorporated in its entirety by reference herein.

TECHNICAL FIELD

This disclosure relates to automation equipment utilized to separate individual sheet metal blanks from a stack of blanks.

BACKGROUND

In sheet metal stamping production lines a stack of sheet metal blanks is delivered to the front of the line in a stack. The blanks in the stack tend to adhere to each other as a result of a vacuum effect caused by the lack of air between adjacent blanks and a film of oil between the adjacent blanks. Individual steel sheet metal blanks may be separated by fanner magnets that fan apart the edges of several of the top blanks to eliminate the vacuum effect created by stacking the blanks because there is no air between adjacent blanks. Vacuum cups located above the top blank are utilized to pick up the top blank and transfer the top blank to downstream automation equipment to feed the blank to a press.

Aluminum sheet metal blanks, or non-magnetic sheet metal blanks, may be separated in the same way but the fanner magnets are relatively ineffective for separating aluminum blanks. Instead of fanner magnets, an air knife may be used that directs a stream of air at the top of the stack of blanks to inject air between the top blank and the stack. The air separates the top blank from the stack and eliminates the vacuum effect, but dirt dust particles, or slivers from the blanking operation at the edge of the stack of blanks may be blown onto the surface of the blanks. Even small dust particles or slivers on the surface of the blanks create visible surface imperfections when the blank is drawn in a draw press or formed in another forming operation.

This disclosure is directed to solving the above problems and other problems as summarized below.

SUMMARY

According to one aspect of this disclosure, an apparatus for destacking sheet metal blanks is disclosed that uses an electro-magnetic pulse to separate the top sheet metal blank from a stack of blanks. The apparatus includes a fixture that supports an electromagnetic attraction device that includes one or more multi-turn electrical coils and one or more insulated metal screens. The coil is electrically connected to a source of stored electrical current, such as a bank of capacitors. The metal screen is disposed in an electrical insulation material and is retained by the fixture between the coil and the top blank of the stack of blanks. Suction cups perform the primary lifting function and are connected to a vacuum source. The suction cups may be supported by the same fixture or another associated fixture that cooperates with the coil and insulated screen.

The destacker operates in a similar manner to existing destackers that use suction cups to lift blanks except for the way that the top blank is separated from the rest of the stack. The destacker fixture manipulates the suction cups and the electro-magnetic attraction together relative to the device stack. The suction cups are pressed against the non-magnetic sheet metal blank, e.g. an aluminum alloy blank, and vacuum is provided to secure the suction cups to the top blank. The electro-magnetic attraction device is positioned close to the top blank and an electromagnetic pulse is generated by discharging the source of stored charge to separate the top blank from the stack. Electric current runs through the multi-turn coil creating an electro-magnetic field that induces electrical currents in both the screen and the upper layer of blanks. The force of the attraction between the screen and the blank is greater than the effect of the inter-blank vacuum and adhesion of the oil film and allows separation of the upper blank from the stack.

The above aspects of this disclosure and other aspects will be described below with reference to the attached drawings.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
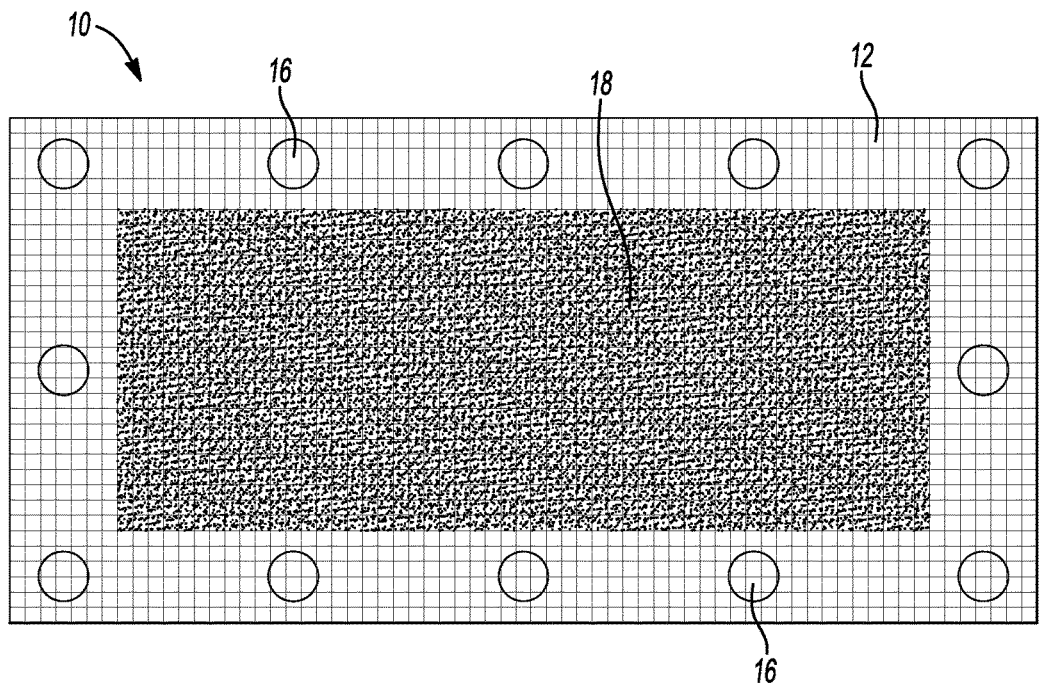
FIG. 1 is a schematic top plan view of a sheet metal destacker made according to one embodiment of this disclosure.
Figure 2:
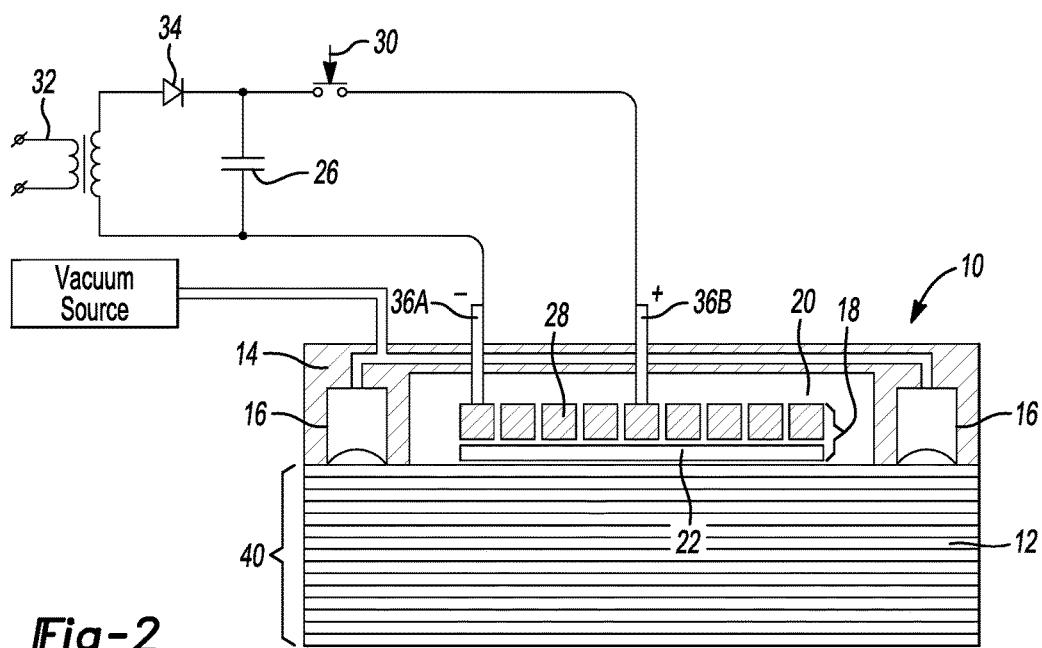
FIG. 2 is a schematic cross-sectional view of the sheet metal destacker shown in FIG. 1.

Referring to FIGS. 1 and 2, a sheet metal destacker 10 is illustrated that is made according to one embodiment of this disclosure. The sheet metal destacker 10 is shown positioned above a blank 12 that is intended to be lifted by the destacker 10. The blank 12 is a non-ferrous material such as aluminum in its primary application. However, it should be understood that the destacker 10 may also be used to separate steel, or ferrous, blanks. A fixture 14, shown in FIG. 2, is provided to support suction cups 16. The suction cups 16 perform the primary lifting function when the blank 12 is loaded into automation equipment (not shown) for a production line (not shown). An electromagnetic attraction device 18 is shown in FIGS. 1 and 2 that is contained within a housing 20. The housing 20 also houses an insulated metallic screen 22. The insulated metallic screen 22 is located within the housing 20.

With specific reference to FIG. 2, a charge storage device 26, such as a bank of capacitors, is connected in an electrical circuit to a multi-turn coil 28. The supply of current to the multi-turn coil is controlled by a low inductance switch 30 that is part of a control system or controller that operates the sheet metal destacker 10. The low inductance switch 30 provides power to the multi-turn coil 28 to attract a blank to facilitate lifting the blank with the suction cup 16. A charging power source 32 is connected through a set of diodes 34 to the charge storage device 26. A pair of electrodes 36A and 36B connect the circuit to the multi-turn coil 28. When the charge storage device 26 is discharged, an electromagnetic pulse is produced in the multi-turn coil 28 described in greater detail below.

A stack of blanks 40 is shown in FIG. 2. The stack of blanks 40 are a plurality of blanks 12 that are preferably aluminum or other non-ferrous metal. A thin film of oil is present on each of the blanks 12. The film of oil is not visible in FIG. 2 but tends to cause individual blanks 12 to adhere to each other and combines with the vacuum effect caused by the lack of air between the panels 12 in the stack 40.

Figure 3A:
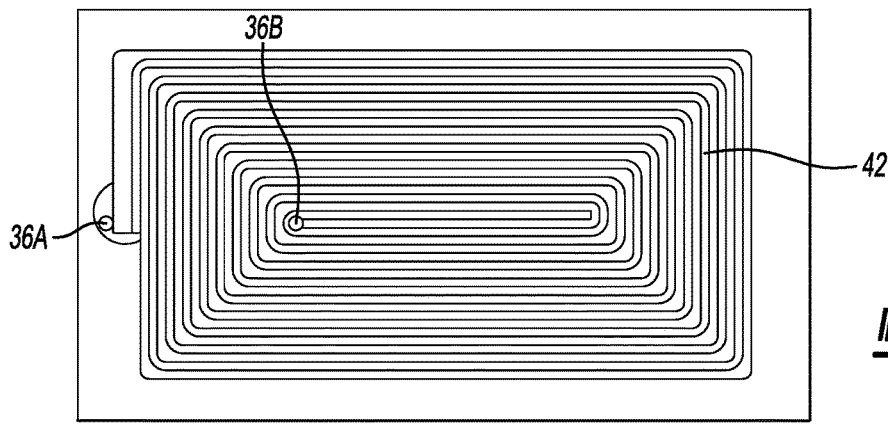
FIG. 3A is a plan view of one embodiment of a multi-turn coil that may be used in the sheet metal destacker shown in FIGS. 1 and 2.

Referring to FIG. 3A, a rectangular machined steel plate coil 42 is shown and may be used with the destacker shown in FIGS. 1 and 2. A pair of electrodes 36A and 36B are connected to opposite ends of the coil 42.

Figure 3B:
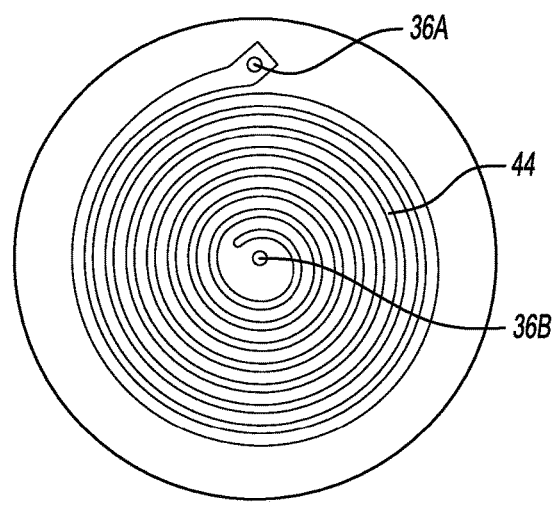
FIG. 3B is a plan view of another embodiment of a multi-turn coil that may be used in the sheet metal destacker shown in FIGS. 1 and 2.

Referring to FIG. 3B, a circular spiral machine coil 44 is illustrated that is also connected to electrodes 36A and 36B and may be included as part of the electromagnetic attraction device 18.

Figure 3C:
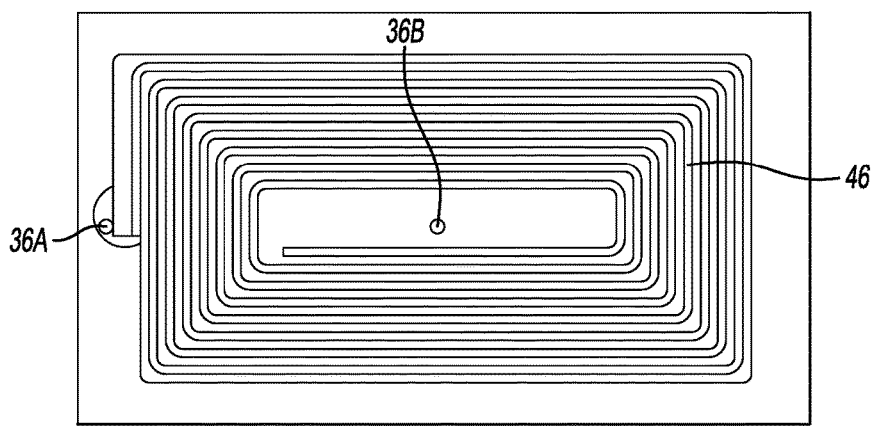
FIG. 3C is a plan view of another embodiment of a multi-turn coil that may be used in the sheet metal destacker shown in FIGS. 1 and 2.

Referring to FIG. 3C, a rectangular water jet cut brass coil 46 is shown that may be included as part of the electromagnetic attraction device 18 and is connected by electrodes 36A and 36B.

Figure 3D:
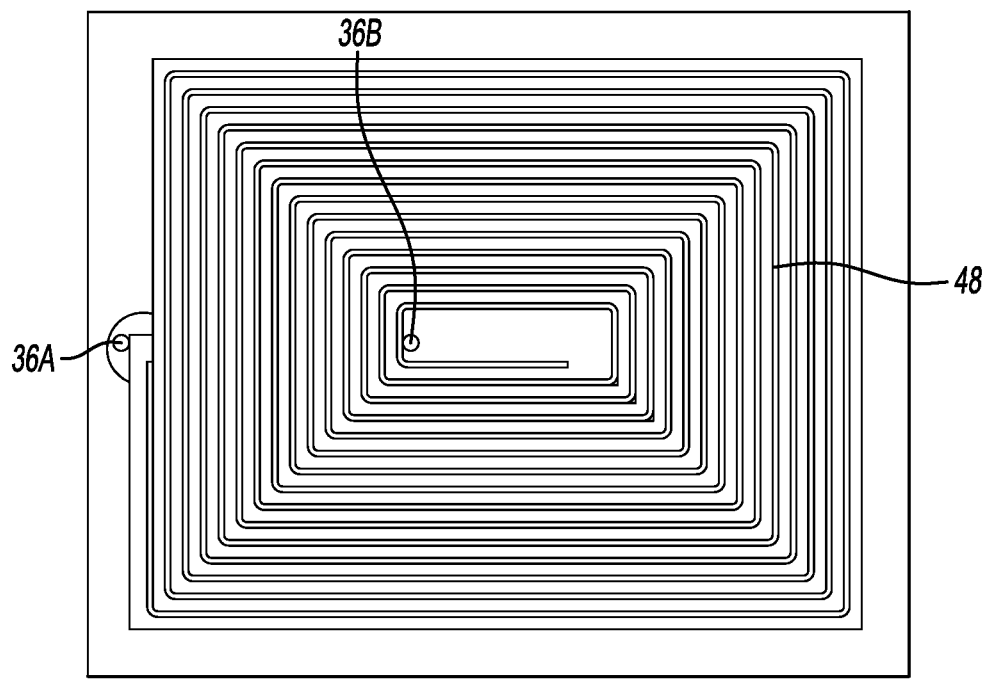
FIG. 3D is a plan view of another embodiment of a multi-turn coil that may be used in the sheet metal destacker shown in FIGS. 1 and 2.

Referring to FIG. 3D, a rectangular water jet cut brass plate coil with machine connectors 48 is shown. The connectors are adapted to be connected to electrodes 36A and 36B of the destacker 10 shown in FIGS. 1 and 2. The coils 42-48 may be the sole coil used in the electromagnetic attraction device 18 or may be one of a plurality of coils.

Figure 4:
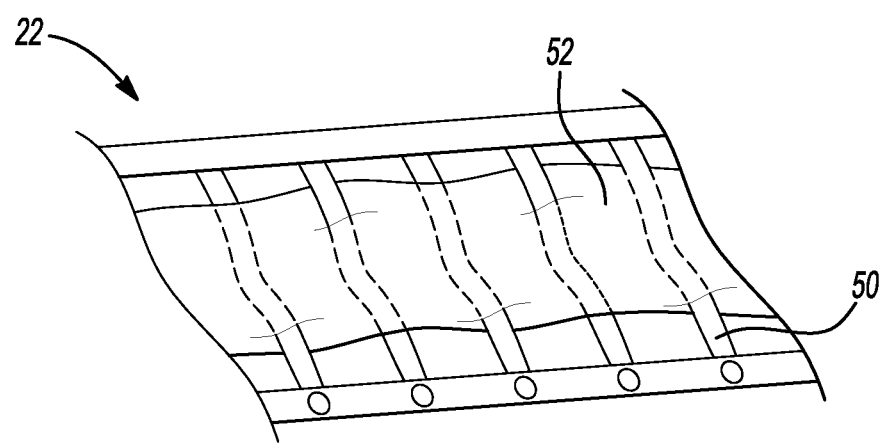
FIG. 4 is a fragmentary diagrammatic view of an insulated metallic screen that may be used with the destacker shown in FIGS. 1 and 2.

Referring to FIG. 4, an insulated metallic screen 22 is shown in greater detail to include a metal screen 50 encased in layer of insulation material 52 such as a polymeric layer, or plastic layer. The insulated metallic screen 22 is contained within the housing 20 as previously described with reference to FIGS. 1 and 2.

Figure 5A:
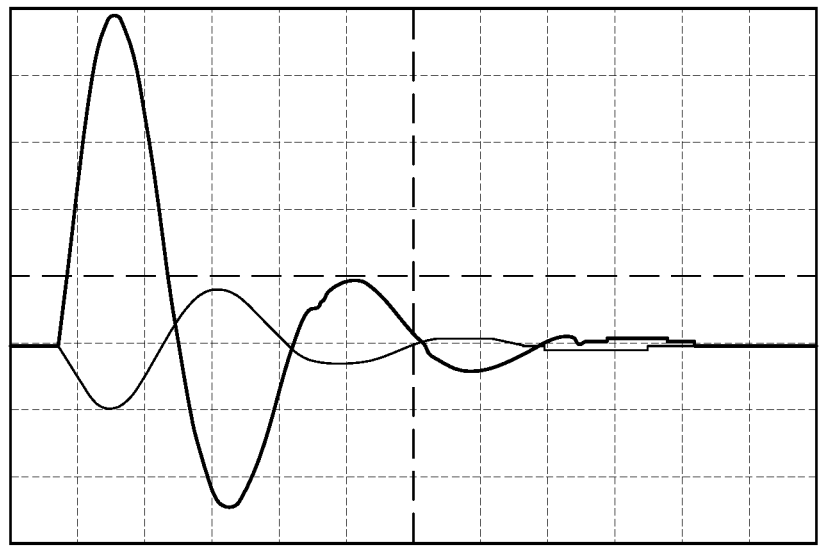
FIGS. 5A and B are graphic representations of wave forms of pulsed electric current in the multi-turn coil and in a blank as it is acted upon by the coil.
Figure 5B:
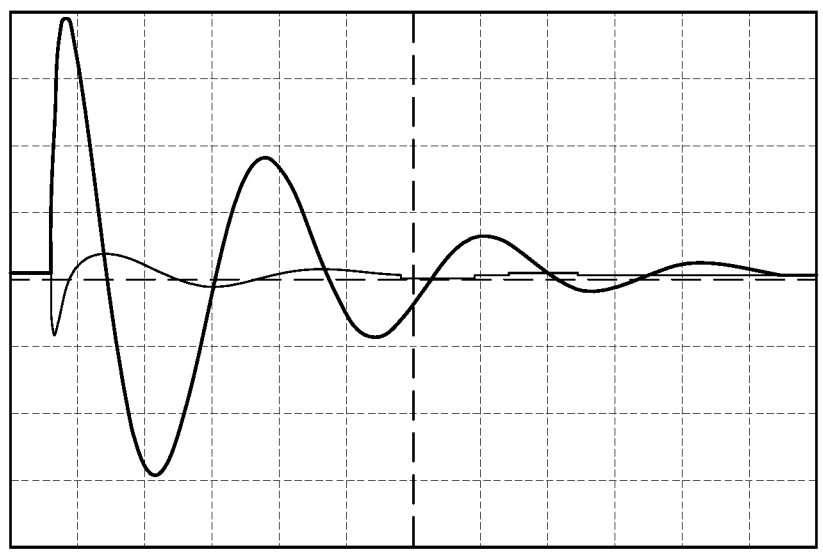

Referring to FIGS. 5A and 5B, wave forms of pulse electric current in the coil are illustrated by the higher amplitude curve and the pulse of electric current in the blank are shown by the lower amplitude curve. In FIG. 5A, a 33 kHz discharge current is provided to the coil. In FIG. 5B, a 1.33 kHz discharge current is shown in the coil as illustrated. FIGS. 5A and 5B represent examples of experimental curves of exciting electric current running through the coil that is synchronized with the induced current running through the blank. Comparison of the discharge frequency of 33 kHz and 1.33 kHz indicates that for 33 kHz, currents in the coil and in the blank have a phase shift of approximately $\pi$ which means that currents run in opposite directions resulting in a strong repelling force. For discharge frequencies of 1.33 kHz, the currents in the coil and in the blank have approximately a $\pi/2$ phase shift leading to a very weak interaction between the currents. The currents periodically change direction.

The electromagnetic attraction creates a force directed inward from the blank 12 to the electromagnetic attraction device 18. The electromagnetic system creates an electromagnetic field from both sides of the sheet metal blank 12 and then eliminates the electromagnetic field from one side by the opposite electromagnetic field generated by the screen 22. The screen 22 functions to create an electromagnetic field of the opposite sign and force to create unidirectional currents for attraction of the non-ferrous sheets 12. The discharge frequency is preferable relatively slow to eliminate repelling forces between the coil 28 and the blank 12. Significant penetration of the electromagnetic field through the blank 12 is facilitated by the slow discharge frequency that also increases the time shift in phases of the current in the coil 28. The induced current in the blank 12 is proportional to the derivative of the inducing current by time. The harmonic shift in phase is approximately $\pi/2$ making the dynamic interaction between the coil 28 and the blank 12 nearly non-essential. The phases of electric current induced in the blank 12 and in the screen 22 are nearly identical allowing the screen 22 to play a major role in separating the blanks 12.

In operation, non-ferrous sheet metal blanks 12 are attracted by providing a low frequency electric discharge through a multi-turn coil 28. Attractive forces are generated by a screen 22 positioned between the multi-turn coil 28 and the sheet metal blank 12 that is intended to be attracted.

The destacker 10, including a plurality of suction cups 16 and one or more electromagnetic attraction devices 18, is moved toward the stack of blanks 40. The suction cups 16 engage the non-ferrous sheet metal blank 12. A signal is sent from the controller of destacker 10 to close the low inductance switch 30, discharging the charge storage device 26. When the switch 30 closes, electric current runs through the multi-turn coil 28 creating an electromagnetic field in the vicinity of the coil 28.

The insulated metallic screen 22 is positioned adjacent the coil 28 between the coil 28 and the blank 12. The insulated metal screen 22 includes a layer of insulation 52 such as a polymeric material over-molded onto the screen 50.

The frequency of the current oscillation is preferably approximately in the range of 500 Hz. With the slow 500 Hz discharge frequency, the screen 22 is essentially transparent to electromagnetic field penetration through the screen and the upper blank 12. Current in the screen 22 and in the blank 12 runs in the same direction and has approximately the same phase. However, the phase of the current in the screen 22 and the blank 12 is shifted in phase to approximately $\pi/2$ relative to the current in the coil 28. As a result, the electrodynamic forces between the coil 28 and the screen 22, as well as between the coil 28 and the blank 12, are minimal.

After the current is discharged through the multi-turn coil 28, the fixture 14 supporting the suction cups 16 moves up with the housing 20 that supports the electromagnetic attraction device 18. The suction cups 16 then function in a conventional manner to transfer the blank 12 into the press automation equipment that delivers the blank 12 into the stamping die. After the blank 12 is unloaded, the destacker 10 returns and repeats the cycle.

The destacker 10, fixture 14 and housing 20 move the suction cups 16 and electromagnetic attraction device 18 together toward the stack 40. The suction cups 16 are pressed against the non-magnetic sheet metal blank 12, i.e. aluminum alloy, and vacuum is provided to secure the suction cups 16 to the top blank 12. The metallic screen 50 is positioned close to the coil 28 but is electrically isolated from the coil 28 by the insulation 52. The capacitors 26 are charged to the required voltage, and the destacker 10 controller sends a signal to a low inductance switch 30 to generate the electromagnetic pulse and separate the top blank 12 from the stack 40. As soon as the switch 30 is closed, electric current runs through the multi-turn coil 28 creating an electromagnetic field that induces electrical currents in both the screen 22 and the upper blanks 12. The current oscillation frequency should be approximately in the range of between 250 and 1,000 Hz which is defined as being generally in the range of 500 Hz to avoid breakdown of the electromagnetic pulse. The electromagnetic field penetrates through the screen 22 and the upper blank 12. The current in both the screen 22 and in the blank 12 flows in the same direction and has approximately the same phase that is shifted in phase to the value of approximately $\pi/2$ relative to the current in the coil 28. The electrodynamic forces between the coil 28 and the screen 22 as well as between the coil 28 and the blank 12 are relatively minimal. Interaction between the coil 28 and the insulated metal screen 22 may lead to slight vibration of the top blanks 12 in the stack 40 that may act to facilitate breaking the vacuum and adhesion of the oil film between the top sheet metal blanks 12. The force of the attraction between the screen 22 and the blank 12 is greater than the effect of the vacuum and adhesion of the oil film and allows separation of the upper blank 22 from the stack 40.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

We claim:

1. A destacker for separating a sheet metal blank from a stack of blanks comprising:
   a fixture;
   a plurality of suction cups carried by the fixture and connected to a source of vacuum;
   an electro-magnetic coil disposed within the fixture and connected to a source of stored electrical charge; and
   a metallic screen disposed within the fixture between the electro-magnetic coil and the sheet metal blank, wherein the electro-magnetic coil and screen separate the sheet metal blank from the stack of blanks when the source of stored electrical charge is discharged through the electro-magnetic coil and the suction cups lift the sheet metal blank.

2. The destacker of claim 1 further comprising:
   a housing associated with the fixture that houses the electro-magnetic coil and holds the metallic screen in a spaced relationship relative to the electro-magnetic coil.

3. The destacker of claim 1 further comprising:
   a layer of electrical insulation provided on the metallic screen.

4. The destacker of claim 3 wherein the layer of electrical insulation is a polymer layer molded onto the metallic screen.

5. The destacker of claim 1 wherein the electro-magnetic coil is a multi-turn electro-magnetic coil.

6. The destacker of claim 1 wherein the plurality of suction cups is arrayed around the electro-magnetic coil in a rectangular array.

7. The destacker of claim 1 wherein the electro-magnetic coil is a rectangular coil.

8. The destacker of claim 1 wherein the electro-magnetic coil is a circular coil.

9. The destacker of claim 1 wherein the electro-magnetic coil is one of a plurality of electro-magnetic coils.

10. The destacker of claim 1 wherein the source of stored electrical charge is a plurality of capacitors.

11. The destacker of claim 1 wherein the electro-magnetic coil is discharged at an oscillation frequency in a range of between 250 Hz and 1,000 Hz.

12. The destacker of claim 1 wherein the electro-magnetic coil is discharged at an oscillation frequency of 500 Hz.

13. A method of separating a top sheet from a stack of blanks comprising:
   positioning a fixture above the stack of blanks;
   discharging a pulse of electro-magnetic energy through an electro-magnetic coil supported by the fixture;
   directing the electro-magnetic energy through a metallic screen to attract the top sheet and separate the top sheet from the stack of blanks; and
   providing a vacuum to a plurality of suction supported by the fixture and lifting the top sheet off of the stack of blanks.

14. The method of claim 13 further comprising:
   providing a housing within the fixture that houses the electro-magnetic coil and holds the metallic screen in a spaced relationship relative to the electro-magnetic coil.

15. The method of claim 13 further comprising:
   providing a polymer layer of electrical insulation on the metallic screen.

16. The method of claim 13 wherein a plurality of suction cups is arrayed around the electro-magnetic coil in a rectangular array and the electro-magnetic coil is a rectangular coil.

17. The method of claim 13 wherein the pulse of electro-magnetic energy is provided by a plurality of capacitors.

18. The method of claim 13 wherein the discharge through the electro-magnetic coil is at an oscillation frequency in a range of between 250 Hz and 1,000 Hz.

19. The method of claim 13 wherein the discharge through the electro-magnetic coil is at an oscillation frequency of 500 Hz.

20. The method of claim 13 further comprising:
   vibrating the top sheet relative to the stack of blanks with the discharge of the pulse of electro-magnetic energy.

* * * * *